April 11, 1950     J. A. HILL     2,503,485
COMBINED CAMERA, LIGHT METER, AND ACCESSORY CASE
Filed Oct. 25, 1948
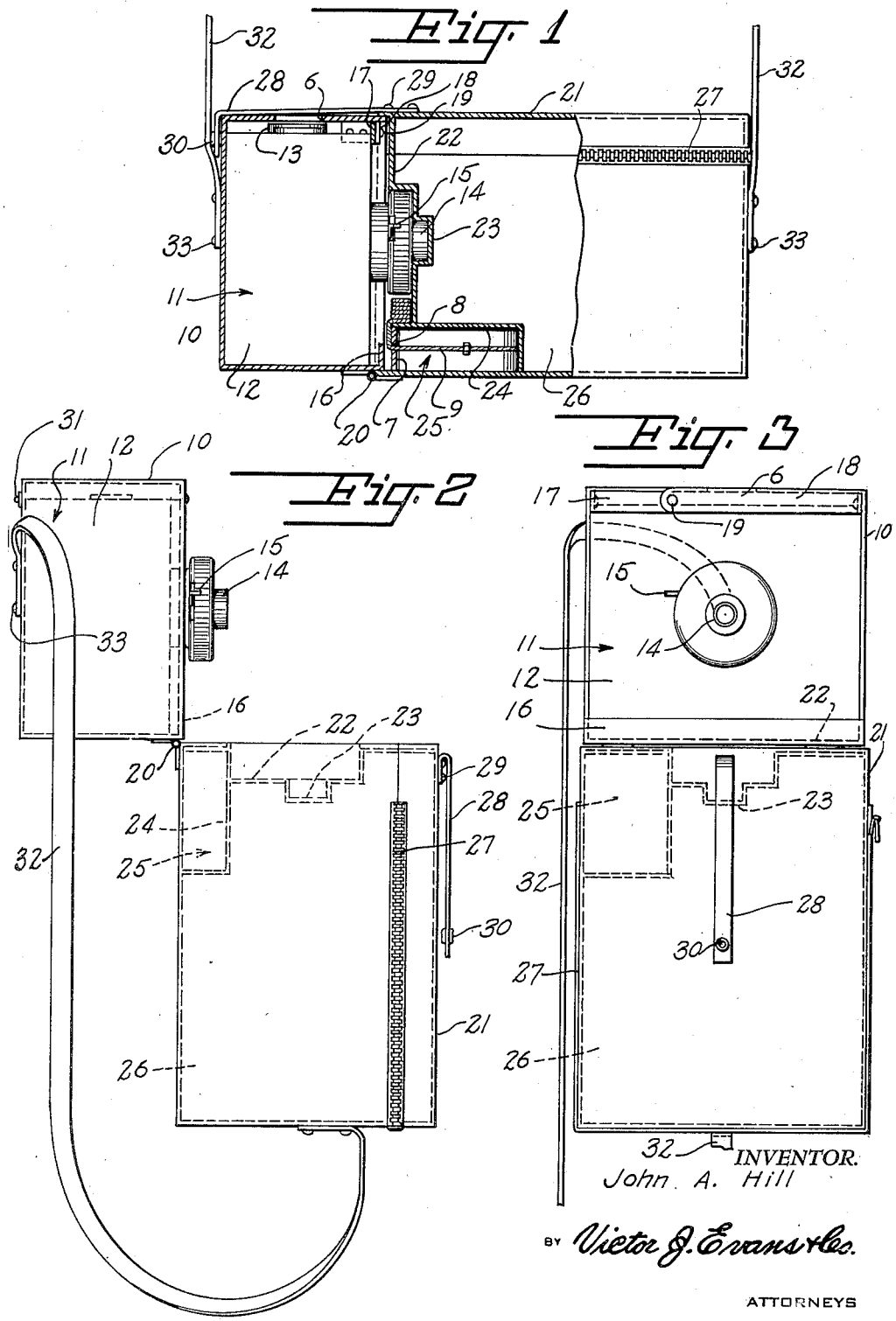
INVENTOR.
John A. Hill
BY *Victor J. Evans & Co.*
ATTORNEYS Patented Apr. 11, 1950

2,503,485

UNITED STATES PATENT OFFICE 2,503,485

COMBINED CAMERA, LIGHT METER, AND ACCESSORY CASE

John Augustus Hill, Paicines, Calif.

Application October 25, 1948, Serial No. 56,336

1 Claim. (Cl. 95—86)

This invention relates to a case for a camera.

The object of the invention is to provide a camera case embodying a first section having a compartment therein for a camera, and a second section hingedly connected to the first section for holding an exposure meter and other camera accessories.

Another object of the invention is to provide a case embodying a first section in which the camera may be carried, and a second section pivotally connected to the first section and constructed so that the operating parts of the camera and light meter are available when the case is opened.

Other objects and advantages will be apparent during the course of the following description.

In the accompanying drawings forming a part of this application, and in which like numerals are employed to designate like parts throughout the same:

Figure 1 is a side elevational view, with parts broken away and in section, illustrating the camera case in closed position;

Figure 2 is a side elevational view of the camera case in open position, wherein the camera and exposure meter are ready to be used;

Figure 3 is a first elevational view of the camera case in open position.

Referring in detail to the drawings, the camera case is preferably fabricated of leather and comprises a first, open-ended section 10 for holding the camera 11. The camera 11 is conventional and includes a housing 12, a view finder 13 in its top, a forwardly-projecting lens 14, and a finger-engaging latch 15 for actuating the camera to take a picture. An aperture 6 is formed in the top of the section 10 for observation of the view finder 13. The camera 11 is maintained in the first section 10 by a leather strip 16 which extends across the front of the camera housing adjacent the bottom thereof, the strip 16 having its ends secured to the section 10. Coacting with the strip 16 in maintaining the camera immobile in the section 10 is a pair of elongated straps 17 and 18 which are arranged above the strip 16, and each has one end secured to the section 10, there being a snap fastener 19 on the other adjacent ends of the straps 17 and 18 for releasably locking the camera in the section 10.

A hinge 20 hingedly connects a second section 21 to the first section 10. A partition 22 extends across the front of the second section 21 and is provided with a socket 23 which snugly and safely receives the lens 14 of the camera when the case is closed. A first compartment 24 for holding an exposure meter 25 is formed in the second section 21, the protecting shield 7 of the compartment 24 being provided with an aperture 8 through which projects the meter string 9, Figure 1. Upon swinging movement of the second section 21 away from the first section 10, the user can gain access to the exposure meter 25. A second compartment 26 is formed in the second section 21 for holding additional camera accessories, such as filters, delayed timers, and color films, and for gaining access to the interior of the second compartment 26, a slide fastener 27 is provided.

For releasably maintaining the first section 10 and second section 21 in their folded or closed positions, Figure 1, a flexible leather band 28 has one end secured by rivets 29 to the second section 21, and the other end of the band 28 is provided with a collar 30 for receiving a button 31 which projects from the first section 10. For carrying the camera case, a strap 32 is provided and has one end secured by suitable rivets 33 to the first section 10, and its other end secured by rivets to the second section 21.

From the foregoing, it will be apparent that a camera case has been provided which is also provided with compartments for holding camera accessories. The second section 21 is designed to swing down in a position so that pictures can be taken immediately. As the two sections 10 and 21 separate, the camera is brought into a position ready to operate, and the exposure meter 25 is positioned adjacent the camera and readily available. Thus, the user need not stoop or waste time in preparation for taking a picture. The carrying strap 32 is of sufficient length so that it will not interfere with the operation of the camera.

As many embodiments may be made of this inventive concept, and as many modifications may be made in the embodiment hereinbefore shown and described, it is to be understood that all matter herein is to be interpreted merely as illustrative and not in a limiting sense.

I claim:

A camera case comprising a first section adapted to hold a camera, a second section hingedly connected to said first section and mounted for movement toward and away from the latter, said second section being provided with a first compartment for holding an exposure meter, there being a second compartment in said section for holding camera accessories, means embodying a slide fastener for gaining access to the interior of said second compartment, means for releasably locking said first and second sections together, a strap having one of its ends connected to said first section and its other end connected to said second section for carrying said case, said last named means comprising a button projecting from said first section, a flexible band having one end secured to said second section, there being a collar in the other end of said band for receiving said button.

JOHN AUGUSTUS HILL.

REFERENCES CITED

The following references are of record in the file of this patent:

UNITED STATES PATENTS

| Number | Name | Date |
|---|---|---|
| 2,290,307 | Wicker | July 21, 1942 |
| 2,323,053 | Kupferschmid | June 29, 1943 |